(12) United States Patent
Slobodin et al.

(10) Patent No.: US 7,172,289 B2
(45) Date of Patent: Feb. 6, 2007

(54) PROJECTION APPARATUS WITH COLORED LIGHT PATH COMBINATION THROUGH A TRANSPARENT OPTICAL ELEMENT

(75) Inventors: David E. Slobodin, Lake Oswego, OR (US); Mark D. Peterson, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/836,459

(22) Filed: Apr. 30, 2004

(65) Prior Publication Data

US 2005/0243281 A1   Nov. 3, 2005

(51) Int. Cl.
G03B 21/00 (2006.01)
G03B 21/28 (2006.01)
G02B 27/12 (2006.01)

(52) U.S. Cl. .......................... 353/31; 353/33; 353/81; 359/639

(58) Field of Classification Search ............ 353/31–33, 353/81, 94, 102; 359/452–453, 455–457, 359/460, 669, 639–640; 348/343, 745
See application file for complete search history.

(56) References Cited

U.S. PATENT DOCUMENTS

| | | | | |
|---|---|---|---|---|
| 2,002,515 A | | 5/1935 | Worrall | |
| 3,743,383 A | * | 7/1973 | Giallorenzi | 359/640 |
| 4,472,797 A | * | 9/1984 | Nicia | 398/43 |
| 4,562,462 A | | 12/1985 | Egan et al. | |
| 5,132,526 A | * | 7/1992 | Iwasaki | 250/201.3 |
| 5,241,416 A | * | 8/1993 | Mitsutake et al. | 359/456 |
| 6,227,669 B1 | * | 5/2001 | Tiao et al. | 353/31 |
| 6,283,597 B1 | * | 9/2001 | Jorke | 353/31 |
| 6,483,533 B1 | * | 11/2002 | Hall et al. | 359/455 |
| 6,500,860 B2 | * | 12/2002 | D'Cruz et al. | 514/492 |
| 6,515,802 B2 | * | 2/2003 | Engelhardt | 359/640 |
| 6,678,095 B2 | * | 1/2004 | Kelly | 359/669 |
| 6,688,747 B2 | | 2/2004 | Wichner et al. | |
| 2001/0048560 A1 | | 12/2001 | Sugano | |
| 2003/0117595 A1 | | 6/2003 | Li et al. | |
| 2003/0156330 A1 | | 8/2003 | Edlinger | |

* cited by examiner

*Primary Examiner*—Christopher Mahoney
(74) *Attorney, Agent, or Firm*—Schwabe Williamson & Wyatt

(57) ABSTRACT

A projection apparatus is formed employing a transparent optical element to receive a plurality of colored light bundles from a plurality of light sources along a plurality of optical paths and to emit the plurality of colored light bundles along a substantially common optical path due, at least in part, to refraction through the transparent optical element.

31 Claims, 5 Drawing Sheets

PROJECTION APPARATUS WITH COLORED LIGHT PATH COMBINATION THROUGH A TRANSPARENT OPTICAL ELEMENT

BACKGROUND

Historically, projection engines of projection systems have been designed employing high intensity discharge lamps. These prior art projection engines/systems suffer from a number of disadvantages. For example, the lamps typically have relatively short lives and reduced brightness after an initial period of usage. Further, there is an appreciable period of waiting for the lamp to warm up, when a projection engine/system is first turned on. During that period, either no image is available or the available images are of poor quality. Additionally, active cooling arrangements are typically required to dissipate the heat created during operation.

Resultantly, there has been a lot of interest in developing and manufacturing in a mass scale projection engines and projection systems employing solid state light sources. Such engines/systems typically either do not have or have the aforementioned disadvantages in a lesser degree.

FIG. 1 illustrates a simplified plane view of a typical solid state light source and micromirror light valve based projection system architecture. The plane view may be a top view or a side view of the projection system. As illustrated, solid state light source based projection system 100 includes a number of constituent colored solid state light sources, such as LEDs 102, 104, and 106 sourcing green (G), red (R), and blue (B) lights respectively. LEDs 102, 104, and 106 are arranged in an orthogonal manner, respectively disposed on three sides of dichroic combiner 108. Dichroic combiner 108 is employed to combine the lights emitted by LEDs 102, 104, and 106. Further, light integrator 110 is placed in the optical path to enhance the combined light. Mirror 112 is employed to reflect the enhanced light onto micromirror device 114. In various embodiments one or more relay lenses (not shown) may also be employed to focus light from the integrator 110 onto micromirror device 114.

Micromirror device 114 includes a number of micromirrors that may be individually tilted to an "on" or an "off" position to selectively reflect the enhanced light reflected from mirror 112 towards projection lens 116 ("on") or away from projection lens 116 ("off"). Resultantly, with each micromirror corresponding to a pixel, and by selectively controlling their positions, an image or a series of images, including a series of images forming a motion picture, may be projected.

While the architecture of FIG. 1 works well, it is nevertheless desirable to further improve on reducing the cost and/or increasing reliability of the next generation of projection engines and projection systems.

BRIEF DESCRIPTION OF THE DRAWINGS

Embodiments of the present invention are illustrated by way of example and not by way of limitation in the figures of the accompanying drawings, in which like references denote similar elements, and in which.

DETAILED DESCRIPTION

Embodiments of the present invention include but are not limited to projection engines and projection systems having a transparent optical element outputting a plurality of colored light bundles along a substantially common optical path.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
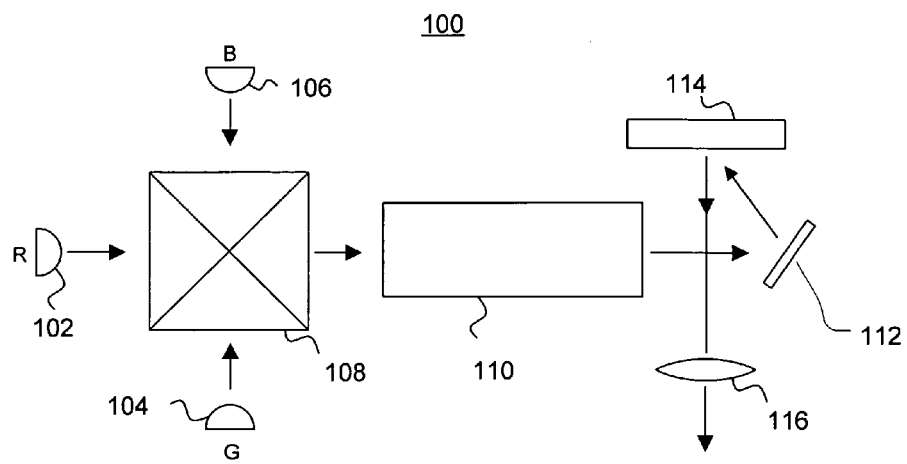
FIG. 1 illustrates a simplified plane view of a typical prior art solid state light source based projection engine/system.
Figure 2:
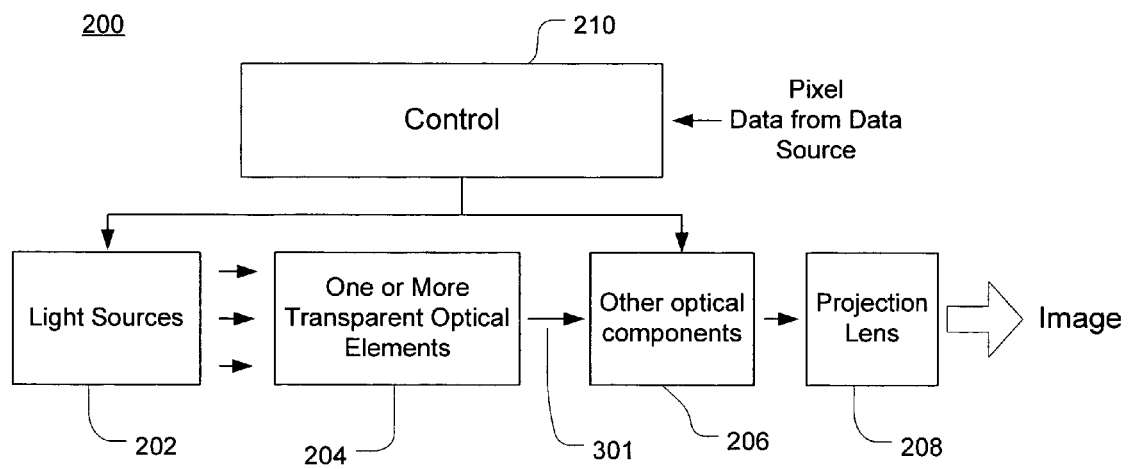
FIG. 2 illustrates a block diagram view of a projection system in accordance with one embodiment of the present invention.

Referring first to FIG. 2 wherein a block diagram view of a projection system 200 for projecting images, in accordance with one embodiment of the present invention, is illustrated. As illustrated, for the embodiment, projection system 200 includes light sources 202, one or more transparent optical element(s) 204, a number of other optical components 206 and projection lens 208, optically coupled to each other as shown. In various embodiments, other optical components 206, include in particular, a light valve (not explicitly shown). Additionally, for the embodiment, projection system 200 includes control block 210 electrically coupled, either directly or indirectly, to light sources 202 and at least the light valve of the other optical components 206.

In one embodiment, the light sources 202 may be employed to output a number of constituent colored light bundles of different wavelengths. The constituent colors may be thought of as the individual colors that, when combined in the appropriate amounts, create an object color for an image pixel. In various embodiments, the constituent colored light bundles may comprise primary colored light bundles, e.g., a red, a blue and a green light bundle. In alternate embodiments, other colored light bundles may be additionally or alternatively provided.

In various embodiments, light sources 202 comprise solid state light sources. More specifically, in some embodiments, light sources 202 comprise light emitting diodes (LEDs), whereas in other embodiments, light sources 202 comprise laser diodes.

One or more transparent optical element(s) 204 may be employed to output the colored light bundles along a substantially common optical path 301 towards other optical components 206. As will be described more fully below, the colored light bundles may be directed onto the common optical path 301 due, at least in part, to varying degrees of refraction of the colored light bundles through the one or more transparent optical element(s) 204. Resultantly, projection system 200 may be formed without the need to employ expensive dichroics that may sacrifice some of the light through undesirable filtering and/or reflecting. Additionally, a common optical path 301 may assist in the conservation of the projection system's étendue, or light throughput, by presenting the colored light bundles to downstream components with similar illumination areas and angles. As will be readily apparent from the description to follow, a wide range of optical elements may be employed to implement the one or more transparent optical element(s) 204.

Other optical components 206 (in particular, the light valve) are primarily employed to selectively direct the colored light bundles to projection lens 208. Optionally, other optical components 206 may also include components such as light integrators and so forth to enhance the uniformity, brightness, and/or other optical attributes of the colored light bundles. Similar to the one or more transparent optical element(s) 204, a wide range of light valves and light integrators may be employed to implement these elements.

Projection lens 208 may project the colored light bundles onto a surface. Likewise, a wide range of projection lenses may be employed to implement projection lens 208.

Control block 210 is employed to control light sources 202 and at least the light valve of the other optical components 206, to modulate the colored light bundles into image bearing light bundles based on the pixel data of the images received. In some embodiments, the pixel data may be provided from, e.g., an external computing/media device or an integrated TV tuner (through, e.g., an input interface). In various embodiments, control block 210 includes drive circuitry (not shown) to apply an amount of voltage or current to drive light sources 202. In various embodiments, control block 210 causes the constituent color light sources 202 to be driven sequentially. The control block may apply control signals to the light valve that correspond with the active constituent color light source 202. In various embodiments, control block 210 may be implemented employing a general purpose processor/controller, an application specific integrated circuit (ASIC), or a programmable logic device (PLD).

In various embodiments, projection system 200 is a projector. In other embodiments, projection system 200 is a projection television.

Figure 3:
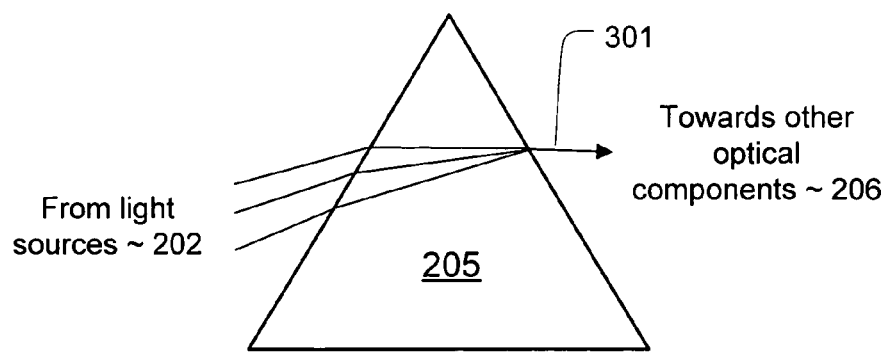
FIG. 3 illustrates a plane view of a transparent optical element comprising a prism in accordance with one embodiment.

FIG. 3 illustrates a plane view of the relative disposition between light sources 202 and a transparent optical element comprising a prism 205 in accordance with one embodiment. The prism 205 may be employed to receive the colored light bundles along a plurality of optical paths and to output the colored light bundles along a common optical path 301 towards other optical components. In one embodiment, the various light sources 202 may be angularly disposed relative to prism 204, such that the corresponding light bundles enter prism 204 with the appropriate angles for the light bundles and the prism, resulting in the light bundles being output along a substantially common optical path 301.

The exact relative angles are application dependent, e.g., dependent on the color of a light bundle, more specifically, its wavelength (which is different for different colors) and the refraction index of the prism (which may be different for different prisms). For a selected prism having a particular optical dispersion (as measured for example by Abbe number), the appropriate relatively disposition for a light source outputting color of a particular wavelength may be empirically determined or computed based on known optical behaviors/relationships, e.g., Snell's law of refraction. In various implementations, a prism composed of material with low Abbe number or high dispersion is desired to enable a higher angular separation (and therefore physical separation) between the color light, e.g., red, green and blue light. (For example a prism made of Hoya E-FDS1glass with an Abbe number of 20.88 enables ~5 degrees of separation between red and green and green and blue light sources, respectively.)

Figure 4A:
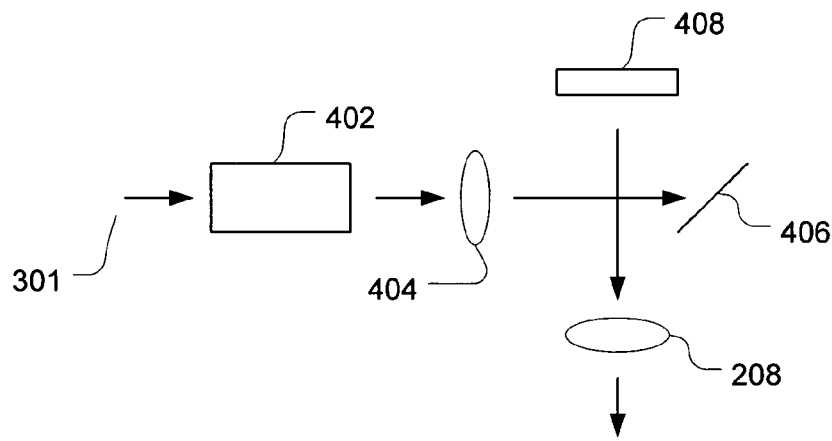
FIGS. 4a–4b illustrate two plane views of the other optical components in accordance with two embodiments.
Figure 4B:
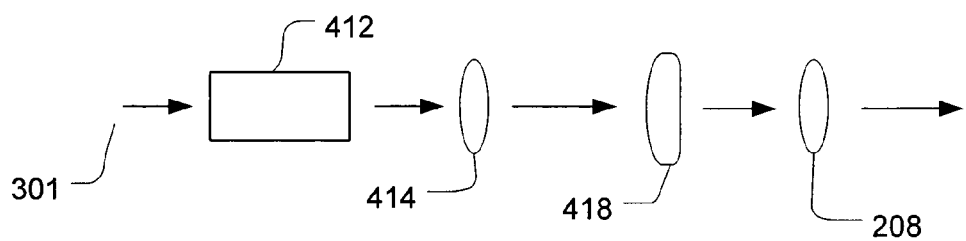

FIGS. 4a–4b illustrate two plane views of other optical components 206 in accordance with two embodiments. For the embodiment of FIG. 4a, other components 206 include light valve 408, which is a reflective light valve, whereas for the embodiment of FIG. 4b, other components 206 include light valve 418, which is a transmissive light valve.

Further, other components 206 of both embodiments may include light integrators, e.g., integrating tunnels 402 and 412, respectively, to homogenize and/or shape the constituent colored light bundles. In other embodiments, the invention may be practiced without the light integrators.

For the embodiment of FIG. 4a, other components 206 may further include lens 404 and mirror 406, optically coupled to each other, and the earlier described reflective light valve 408 and integrating tunnel 402 as shown.

For the embodiment of FIG. 4b, other components 206 may further include lens 414 optically coupled to the earlier described transmissive light valve 418 and integrating tunnel 412 as shown.

Figure 5:
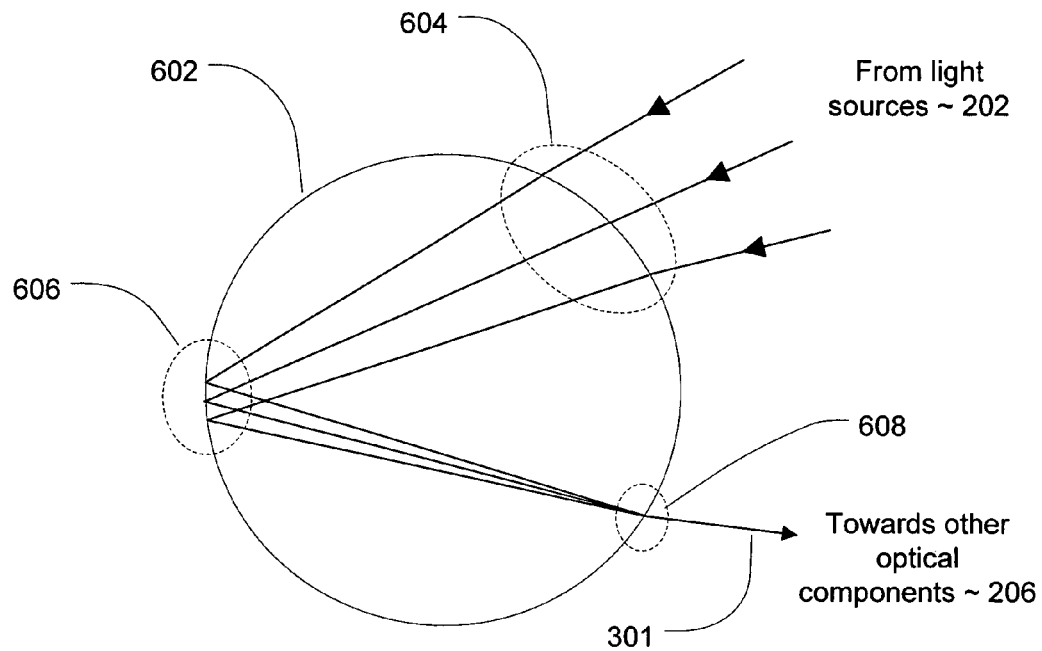
FIG. 5 illustrates a plane view of a transparent optical element comprising an optical bead in accordance with an embodiment of the present invention.

FIG. 5 illustrates a plane view of a transparent optical element comprising an optical bead 602 in accordance with one embodiment. The optical bead 602 may receive the constituent colored light bundles of different wavelengths along separate optical paths. Upon entering the optical bead 602, the light bundles may be refracted some degree 604 due to the optical bead 602 having a different refractive index than the surrounding air. In one embodiment, the light bundles may be internally reflected 606 towards the output of the optical bead 602. In one embodiment, the internal reflection 606 may be total internal reflection due to the incident angles of the colored light bundles being greater than the critical angle. In one embodiment, a reflective coating may be applied to the optical bead 602 to promote the internal reflection 606. Upon exiting the optical bead 602, the light bundles may again be refracted 608, such that they are output along a substantially common optical path 301. The optical bead 602 may be comprised of, e.g., glass, plastic, or some other clear material. In one embodiment, the material may have a refractive index greater than the refractive index of air.

In one embodiment, an array of optical beads, similar to the optical bead 602, may be placed adjacent to a plurality of different colored light sources. Each of these beads, which may be smaller than the light sources themselves, may receive light bundles of each color and output them along respective output paths that travel in a substantially common direction towards the downstream optical components. The array may be comprised of one or more layers of optical beads.

Figure 6A:
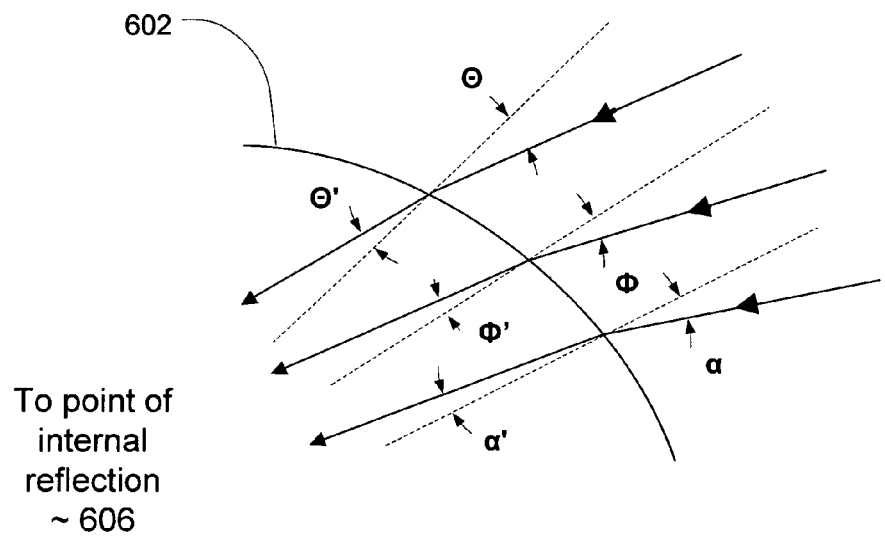
FIGS. 6a–6b illustrate input and output refractions of colored light bundles through the optical bead.
Figure 6B:
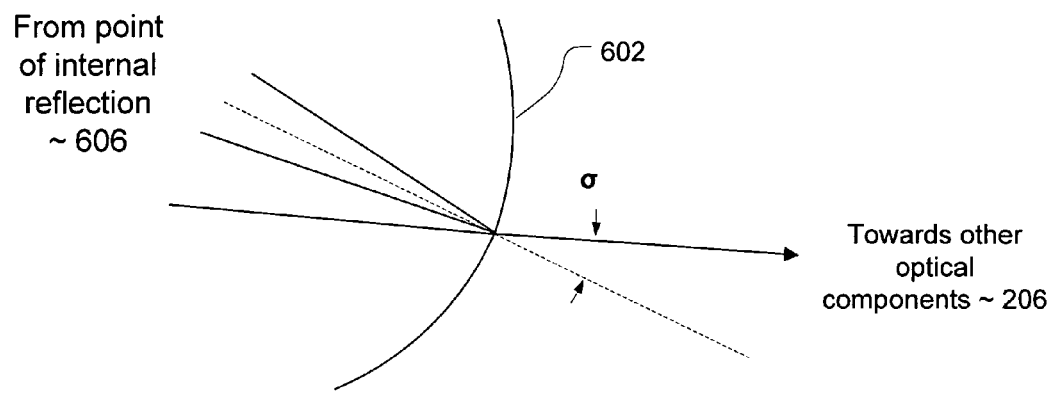

FIGS. 6a–6b illustrate the input refractions 604 and the output refractions 608 in greater detail, in accordance with an embodiment of the present invention. Referring first to FIG. 6a, the colored light bundles of different wavelengths may enter the optical bead 602 along a plurality of optical paths which form input angles θ, Φ, and α. Due to the varying wavelengths of the different colored light bundles, each light bundle may be refracted in varying degrees resulting in respective input refraction angles of θ', Φ', and α'. The refracted light bundles may travel through the optical bead 602 and be internally reflected 606 back towards the output refraction area. Referring now to FIG. 6b, the reflected light bundles may encounter the optical bead boundary at respective incident angles such that each of the colored light bundles of different wavelengths have a similar output refraction angle σ resulting in a substantially common optical path 301 for the colored light bundles.

Similar to the embodiment discussed with reference to FIG. 4, the relative positioning of the optical bead 602 such that the different colored light bundles enter the optical bead 602 along separate optical paths and exit along a substantially common optical path 301 may be application dependent. This relative positioning may depend on, e.g., the wavelength of the light bundle, the dimension of the optical bead, and the refractive index of the optical bead. The relative positioning of the optical bead 602 may be empirically determined or computed for a particular embodiment based on known optical behaviors/relationships.

In one embodiment, the refraction through one transparent optical element may not result in the different colored light bundles exiting along a substantially common optical path. This may result from, e.g., the relative positioning of the plurality of light sources and the transparent optical element. In this embodiment, it may be desirable to employ a plurality of transparent optical elements in an arrangement such that they receive the colored light bundles in sequence and incrementally reduce the optical path separation until all of the light bundles are output along a substantially common optical path.

Figure 7:
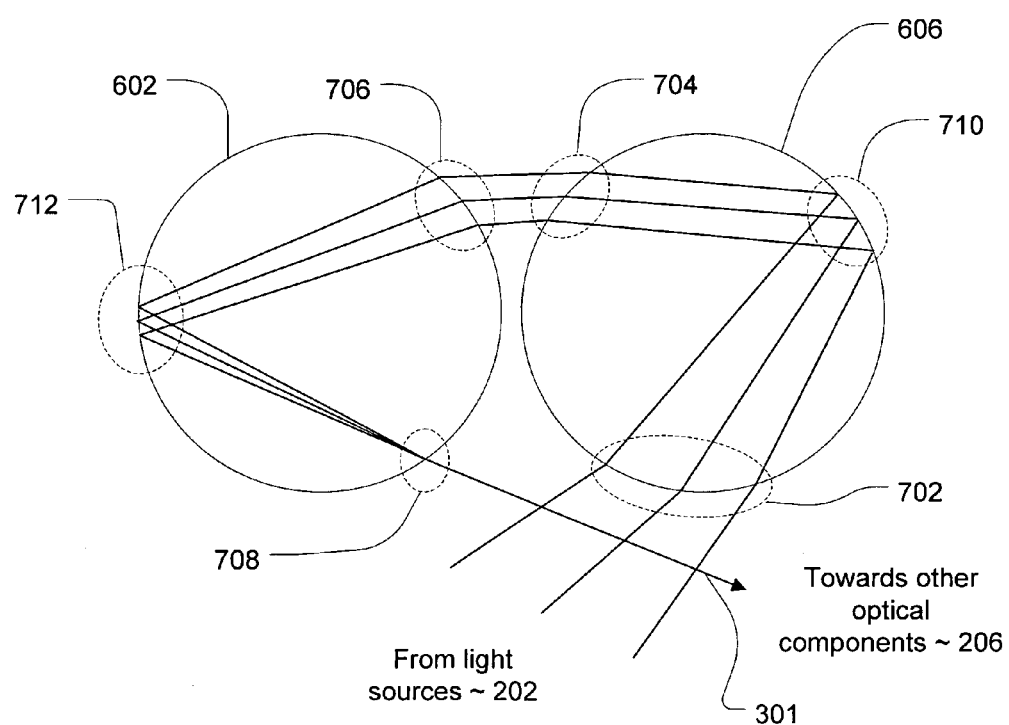
FIG. 7 illustrates a plurality of optical beads outputting a substantially common optical path in accordance with an embodiment of the present invention.

FIG. 7 illustrates a plane view of a plurality of transparent optical elements comprising optical beads 602 and 606, in accordance with an embodiment of the present invention. In this embodiment, the light bundles may enter the input optical bead 606, along three separate optical paths and exit an output optical bead 602 along a substantially common optical path 301. In this embodiment the light bundles may be refracted a total of four times (entering the input optical bead 702, exiting the input optical bead 704, entering the output optical bead 706, and exiting the output optical bead 708) and internally reflected twice 710 and 712. Depending on the particularities of an embodiment a number of factors may be adjusted to accommodate a wide range of incoming optical paths such that they exit on the common optical path 301. Examples of these factors may include, but are not limited to, the number, size, material, shape and positioning of the plurality of transparent optical elements.

Figure 8A:
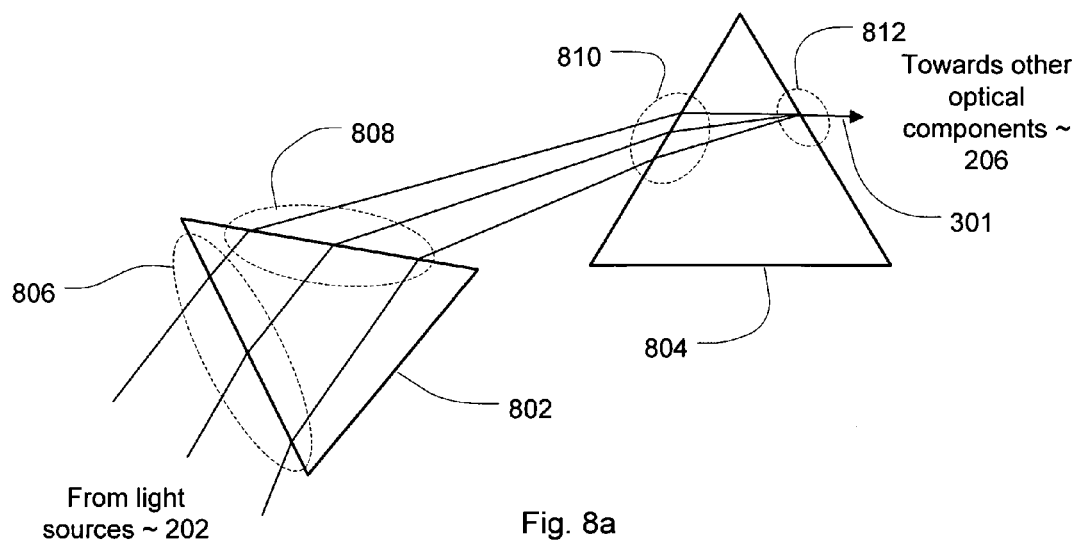
FIGS. 8a–8b illustrate two embodiments of a plurality of prisms outputting a substantially common optical path.

FIG. 8a illustrates a plurality of transparent optical elements comprising prisms 802 and 804 in accordance with an embodiment of the present invention. Specifically, this embodiment comprises an input prism 802 to receive the plurality of colored light bundles along separate optical paths, and an output prism 804 to output the plurality of colored light bundles along a substantially common optical path 301. Similar to the above embodiment, the colored light bundles are refracted a total of four times (entering the input prism 806, exiting the input prism 808, entering the output prism 810, and exiting the output prism 812). However, in this embodiment, the colored light bundles are not internally reflected. Other embodiments using a plurality of prisms may include internal reflections of the colored light bundles.

Figure 8B:
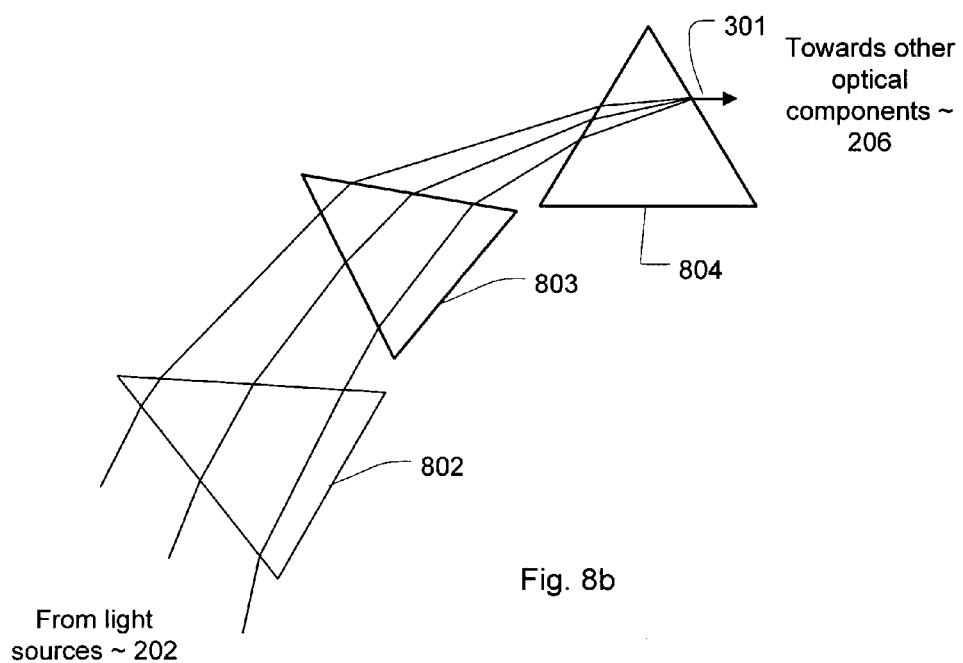

FIG. 8b illustrates an intermediate transparent optical element positioned between the input transparent optical element and the output transparent optical element, in accordance with an embodiment of this invention. Specifically in this embodiment an intermediate prism 803, is added in order to facilitate the output prism 804 outputting the optical paths onto a substantially common optical path 301. Therefore, in this embodiment the optical path separation is incrementally reduced as the different colored light bundles are refracted in varying degrees through the series of transparent optical elements, e.g., prisms 802, 803 and 804. Similar to the above discussion, many factors may be adjusted to accommodate the particularities of a given embodiment.

Thus, it can be seen from the above description, a projection system having light sources and one or more transparent optical element(s) outputting light along a substantially common optical path have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. An apparatus comprising:
   an input transparent optical element having a first shape;
   an output transparent optical element having a second shape, similar to the first shape, the input and output transparent optical elements optically coupled to one another and arranged in such a manner that a plurality of colored light bundles of different wavelengths enter the input transparent optical element along a plurality of optical paths and exit the output transparent optical element along a substantially common optical path, due, at least in part, to varying degrees of refraction of the plurality of colored light bundles of different wavelengths through the transparent optical elements; and
   at least one intermediate transparent optical element to receive the plurality of colored light bundles of different wavelengths from the input transparent optical element and transmit the plurality of colored light bundles of different wavelengths to the output transparent optical element.

2. The apparatus of claim 1, wherein each of the transparent optical elements comprise an element selected from the group consisting of an optical bead and a prism.

3. The apparatus of claim 1, wherein the plurality of colored light bundles of different wavelengths comprise at least two light bundles selected from the group consisting of a red colored light bundle, a blue colored light bundle, and a green colored light bundle.

4. A projection system comprising:
   a projection lens;
   a plurality of light sources to output a plurality of colored light bundles of different wavelengths; and
   an input transparent optical element and an output transparent optical element optically coupled to one another, the projection lens, and the plurality of light sources; the transparent optical elements arranged in such a manner that the plurality of colored light bundles of different wavelengths enter the input transparent optical element along a plurality of optical paths and exit the output transparent optical element along a substantially common optical path due, at least in part, to varying degrees of refraction of the plurality of colored light bundles of different wavelengths through the transparent optical elements.

5. The projection system of claim 4, wherein the plurality of light sources comprise at least two light sources selected from the group consisting of a red colored light source, a blue colored light source, and a green colored light source.

6. The projection system of claim 4, wherein the plurality of light sources comprise at least one solid state light source.

7. The projection system of claim 6, wherein the at least one solid state light source comprises at least one diode selected from the group consisting of a light emitting diode and a laser diode.

8. The projection system of claim 4, further comprising:
a light integrator optically coupled to the output transparent optical element to substantially integrate each of the plurality of colored light bundles.

9. The projection system of claim 8, further comprising:
a light valve optically coupled to the light integrator to modulate the plurality of colored light bundles exiting the light integrator into image bearing light bundles to be optically coupled to the projection lens.

10. The projection system of claim 9, further comprising:
a processor to send control signals to the light valve representing an image; and
an input interface coupled to the processor to facilitate input to the processor pixel data of the image.

11. The projection system of claim 10, wherein the projection system further comprises a television tuner coupled to the input interface.

12. The projection system of claim 4, wherein the input transparent optical element has a first shape and the output transparent optical element has a second shape that is similar to the first shape.

13. In a projection apparatus, a method of operation comprising:
controlling a plurality of light sources to output a plurality of colored light bundles of different wavelengths;
receiving the plurality of colored light bundles of different wavelengths with an input transparent optical element, having a first shape along a plurality of optical paths;
transmitting the plurality of colored light bundles from the input transparent optical element to an output optical element, having a second shape similar to the first shape; and
outputting the plurality of colored light bundles from the output transparent optical element along a substantially common optical path due, at least in part, to varying degrees of refraction of the plurality of colored light bundles of different wavelengths through the transparent optical elements.

14. The method of claim 13, wherein said controlling comprises controlling the plurality of light sources to alternate in outputting the plurality of colored light bundles at different points in time.

15. The method of claim 14, further comprising:
receiving pixel data of an image to be projected; and
controlling a light valve, optically coupled to the output transparent optical element, to modulate the plurality of colored light bundles into image bearing light bundles as needed for the projection of the image.

16. An apparatus comprising:
a plurality of light sources to output a plurality of colored light bundles of different wavelengths; and
an optical bead to receive the plurality of colored light bundles of different wavelengths along a plurality of optical paths and to output the plurality of colored light bundles of different wavelengths along a substantially common optical path due, at least in part, to varying degrees of refraction of the plurality of colored light bundles of different wavelengths through the optical bead.

17. The apparatus of claim 16, wherein the plurality of light sources comprise at least two light sources selected from the group consisting of a red colored light source, a blue colored light source, and a green colored light source.

18. The apparatus of claim 16, wherein the plurality of light sources comprise at least one solid state light source.

19. The apparatus of claim 16, wherein the optical bead is to internally reflect the plurality of colored light bundles at least one time prior to outputting the plurality of colored light bundles along a substantially common optical path.

20. The apparatus of claim 16, wherein the optical bead is one of a plurality of optical beads arranged in an array to receive light from the plurality of light sources, and to transmit light in a substantially common direction.

21. A projection system comprising:
a projection lens;
a plurality of light sources to output a plurality of colored light bundles of different wavelengths;
an optical bead, optically coupled to the projection lens and the plurality of light sources, to receive the plurality of colored light bundles along a plurality of optical paths and to output the plurality of colored light bundles along a substantially common optical path due, at least in part, to varying degrees of refraction of the colored light bundles of different wavelengths through the optical bead.

22. The projection system of claim 21, wherein the plurality of light sources comprise at least two light sources selected from the group consisting of a red colored light source, a blue colored light source, and a green colored light source.

23. The projection system of claim 21, wherein the plurality of light sources comprise at least one solid state light source.

24. The projection system of claim 23, wherein the at least one solid state light source comprises at least one diode a selected from the group consisting of a light emitting diode and a laser diode.

25. The projection system of claim 21, further comprising:
a light integrator optically coupled to the optical bead to substantially integrate each of the plurality of colored light bundles.

26. The projection system of claim 25, further comprising:
a light valve optically coupled to the light integrator to modulate the plurality of colored light bundles exiting the light integrator into image bearing light bundles to be optically coupled to the projection lens.

27. The projection system of claim 26, further comprising:
a processor to send control signals to the light valve representing an image; and an input interface coupled to the processor to facilitate input to the processor pixel data of the image.

28. The projection system of claim 27, further comprising:

a television tuner coupled to the input interface.

29. In a projection apparatus, a method of operation comprising:

controlling a plurality of light sources to output colored light bundles of different wavelengths towards an optical bead, the optical bead receiving the plurality of colored light bundles of different wavelengths along a plurality of optical paths and outputting the plurality of colored light bundles of different wavelengths along a substantially common optical path due, at least in part, to varying degrees of refraction of the plurality of colored light bundles of different wavelengths through the optical bead.

30. The method of claim 29, wherein said controlling comprises controlling the plurality of light sources to alternate in outputting the plurality of colored light bundles at different points in time.

31. The method of claim 29, further comprising:

receiving pixel data of an image to be projected; and controlling a light valve, optically coupled to the optical bead, to modulate the plurality of colored light bundles into image bearing light bundles as needed for the projection of the image.

* * * * *